(12) United States Patent
Saari et al.

(10) Patent No.: US 12,326,238 B2
(45) Date of Patent: Jun. 10, 2025

(54) HYPERSPECTRAL LIGHT SOURCE

(71) Applicant: Teknologian tutkimuskeskus VTT Oy, Espoo (FI)

(72) Inventors: Heikki Saari, Espoo (FI); Christer Holmlund, Espoo (FI); Ingmar Stuns, Espoo (FI)

(73) Assignee: Teknologian tutkimuskeskus VTT Oy, Espoo (FI)

( * ) Notice: Subject to any disclaimer, the term of this patent is extended or adjusted under 35 U.S.C. 154(b) by 0 days.

(21) Appl. No.: 18/710,236

(22) PCT Filed: Nov. 15, 2022

(86) PCT No.: PCT/FI2022/050749
§ 371 (c)(1),
(2) Date: May 15, 2024

(87) PCT Pub. No.: WO2023/089236
PCT Pub. Date: May 25, 2023

(65) Prior Publication Data
US 2025/0003576 A1   Jan. 2, 2025

(30) Foreign Application Priority Data
Nov. 17, 2021 (FI) .................................... 20216177

(51) Int. Cl.
*F21V 14/08* (2006.01)
*F21V 9/08* (2018.01)
(Continued)

(52) U.S. Cl.
CPC ............... *F21V 14/08* (2013.01); *F21V 9/08* (2013.01); *F21V 9/40* (2018.02); *F21Y 2115/10* (2016.08)

(58) Field of Classification Search
CPC ... F21V 14/08; F21V 9/40; F21V 9/08; F21Y 2115/10
See application file for complete search history.

(56) References Cited

U.S. PATENT DOCUMENTS 5,710,663 A    1/1998   Kawasaki
6,262,837 B1   7/2001   Nagano et al.
(Continued)

FOREIGN PATENT DOCUMENTS

WO      WO-2013049085 A1 *  4/2013   ............... G01J 3/10

OTHER PUBLICATIONS

Jeong et al: Spectrally resolved fluorescence lifetime imaging microscope using tunable bandpass filters. Review of Scientific Instruments, American Institute of Physics, Sep. 1, 2012, vol. 83, No. 9, pp. 93705-93705.
(Continued)

*Primary Examiner* — Mary Ellen Bowman
(74) *Attorney, Agent, or Firm* — Laine IP Oy (57) ABSTRACT

According to an example aspect of the present invention, there is provided a hyperspectral light source system, comprising a broadband light source arranged to generate and radiate a broadband light signal, a rotating multi bandpass filter arranged to pass through a part of the broadband light signal on one of multiple passbands of the hyperspectral light source system, wherein a rotation angle of the rotating multi bandpass filter determines the part of the broadband light signal that passes through the rotating multi bandpass filter and a tunable filter adjusted to pass through the part of the broadband light signal, coming from the rotating multi bandpass filter, on said one passband of the hyperspectral light source system.

13 Claims, 8 Drawing Sheets

(51) Int. Cl.
*F21V 9/40* (2018.01)
*F21Y 115/10* (2016.01)

(56) References Cited

U.S. PATENT DOCUMENTS

| | | | |
|---|---|---|---|
| 9,835,847 B2 * | 12/2017 | Saari | G02B 26/007 |
| 10,801,697 B2 * | 10/2020 | Dattner | F21V 29/503 |
| 2007/0285659 A1 | 12/2007 | Hsieh et al. | |
| 2010/0027004 A1 | 2/2010 | Bonyuet et al. | |
| 2010/0290045 A1 | 11/2010 | Saptari | |
| 2011/0109909 A1 * | 5/2011 | Wu | G01J 3/26 |
| | | | 362/19 |
| 2011/0170164 A1 * | 7/2011 | Wang | G02B 5/286 |
| | | | 359/290 |
| 2012/0314295 A1 | 12/2012 | Fukuyo et al. | |
| 2017/0343477 A1 * | 11/2017 | Santori | G01J 3/18 |
| 2018/0052099 A1 | 2/2018 | Hill et al. | |
| 2018/0196246 A1 | 7/2018 | Bares et al. | |
| 2019/0041329 A1 | 2/2019 | Hill et al. | |

OTHER PUBLICATIONS

Saari et al: Novel hyperspectral imager based on angle-tuned multi pass band filter, Leds and RGB image sensor. The 13th Japan-Finland Joint Symposium on Optics in Engineering, 2019, pp. 101-102.

* cited by examiner

HYPERSPECTRAL LIGHT SOURCE

FIELD

Embodiments of the present invention relate in general to hyperspectral light sources.

BACKGROUND

Hyperspectral imaging refers to analysing a broad spectrum of light instead of merely analysing the spectrum of primary colors for each point. That is, in case of hyperspectral imaging information is collected and analysed over a broad electromagnetic spectrum, to get the spectrum for each point. Hyperspectral imaging may be used for example to locate objects and detect various materials. In case of many applications of hyperspectral imaging, tunable light sources should not be bulky and expensive. There is therefore a need to provide small, low-cost tunable light sources for hyperspectral imaging, e.g., for hyperspectral imaging of mouth or eye and in hyperspectral microscopy and hyperspectral endoscopy.

SUMMARY OF THE INVENTION

According to some aspects, there is provided the subject-matter of the independent claims. Some embodiments are defined in the dependent claims.

According to an aspect of the present invention, there is provided a hyperspectral light source system, comprising a broadband light source arranged to generate and radiate a broadband light signal, a rotating multi bandpass filter arranged to pass through a part of the broadband light signal on one of multiple passbands of the hyperspectral light source system, wherein a rotation angle of the rotating multi bandpass filter determines the part of the broadband light signal that passes through the rotating multi bandpass filter, and a tunable filter adjusted to pass through the part of the broadband light signal, coming from the rotating multi bandpass filter, on said one passband of the hyperspectral light source system.

EMBODIMENTS

Embodiments of the present invention relate in general to hyperspectral imaging. More specifically, embodiments of the present invention provide an improved hyperspectral light source system for hyperspectral imaging, the hyperspectral light source system comprising at least a rotating multi bandpass filter, at least one broadband light source and a tunable filter, such as a Fabry-Perot Interferometer, FPI, a Lyot filter, an Acousto-optic filter or a liquid crystal modulator. The rotating multi bandpass filter may be arranged to pass through a part of a broadband light signal, depending on a current angle of the rotating multi bandpass filter, while the tunable filter may be adjusted to pass through the part of the broadband light signal on one of multiple passbands of the hyperspectral light source system. Such a hyperspectral light source system enables building of a compact, low-cost wavelength tunable hyperspectral light source. Dimensions of the light source system may be as small as 10 mm×10 mm×20 mm.

The rotating multi bandpass filter may be adjusted by rotating and the tunable filter may be adjusted as well, to pass through light signals on a selected passband of the broadband light source system. For instance, if the tunable filter is an FPI, the interferometer may be adjusted by adjusting a mirror gap of the interferometer. For instance, the FPI may be a metallic mirror or dielectric mirror Microelectromechanical system FPI, MPFI, or a piezo-actuated FPI. The metallic mirror MFPI is described in patent publication U.S. Pat. No. 10,732,041 B2. The spectral resolution of the provided light source system depends on the used interferometer. When more spectral intensity is needed the piezo-actuated FPI may be used. It is possible to select with a mirror gap adjusted FPI one of the multiple passbands of the broadband light source system.

Even though a tunable FPI is used as an example of a tunable filter in some embodiments of the present invention, any other suitable tunable filter, such as a Lyot filter, an Acousto-optic filter or a liquid crystal modulator may be used in the same way instead of a tunable FPI.

The angle of rotation of the rotating multi bandpass filter may further determine the selected passband, wherein the selected passband is a part of one passband of the broadband light source system and corresponds to a selected rotation angle of the rotating multi bandpass filter. The rotating multi bandpass filter may be rotated continuously or stepwise, for example with a motor at a frequency range from 0 to 250 Hz (0<f≤250 Hz).

For example, a broadband light source may be arranged to radiate broadband light signals having wavelengths between 400-1000 nm. Passbands of the hyperspectral light source system may comprise a first passband for light signals having wavelengths between 420-650 nm and a second passband for light signals having wavelengths between 625-870 nm. The interferometer may be adjusted to pass through light signals on the first passband of the hyperspectral light source system. Moreover, the rotating multi bandpass filter may be arranged to pass through a part of light signals on the first passband of hyperspectral light source system with a resolution of 3 nm for example.

The rotating multi bandpass filter may pass through a part of the broadband signals on the first passband of the hyperspectral light source system, such as light signals having wavelengths between 420-423 nm, when the rotation angle of the rotating multi bandpass filter causes passing this part of the broadband light signals on the first passband of the hyperspectral light source system through. That is, the broadband light source may radiate the broadband light signals at a time when the rotation angle of the rotating multi bandpass filter causes passing this part of the broadband light signals through. At a different time, the rotation angle of the rotating multi bandpass filter may be different and the rotating multi bandpass filter may pass through another part of the broadband signals on the first passband of the hyperspectral light source system, such as light signals having wavelengths between 424-427 nm, and so forth.

In some embodiments, said one passband of the hyperspectral light source system may be selected by setting the FPI mirror gap to correspond to the selected passband. The broadband light source may be turned on at a right time, so that the rotation angle of the rotating multi bandpass filter corresponds to the selected passband, or a part of the selected passband so that the desired part of the broadband light signals passes through the rotating multi bandpass filter and the interferometer. The broadband light source may be switched off after a while, once the rotating multi bandpass filter has rotated enough.

The broadband light source may be turned on for example two or four times per revolution (360 degree rotation) of the rotating multi bandpass filter. Light signals on the selected passband may pass through when a rotation angle of the rotating multi bandpass filter, versus optical axis of the FPI, corresponds to the rotation angle at which the rotating multi bandpass filter passes through light signals on the same selected passband as the FPI. If the rotation angle is selected so that the normal of the rotating multi bandpass filter is along the optical axis, two angles per revolution will produce same spectral transmission performance. That is, if the angle of the rotating multi bandpass filter deviates from the normal by an angle of $\Theta$, the angles $-\Theta$, $180+\Theta$ and $180-\Theta$ will produce same spectral transmission performance.

In some embodiments, the rotation angle of the multi bandpass filter may be monitored with a sensor, such as a standard reflection sensor or with an encoder, and timing of the broadband light source may be tuned accordingly. The broadband light source may be electrically controllable. The broadband light source may be a white Light Emitting Diode, LED, a broadband infrared LED or similar.

Figure 1:
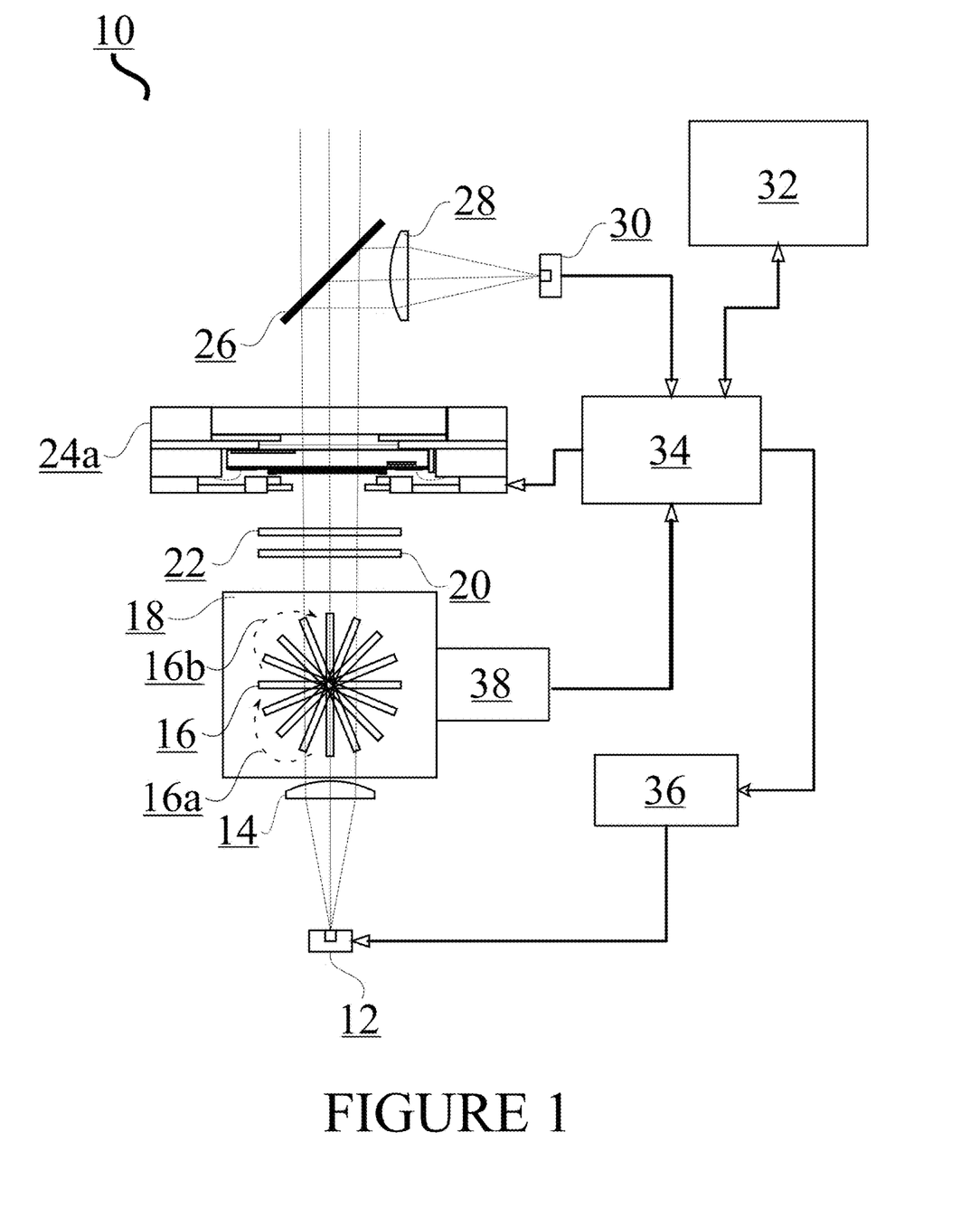
FIG. 1 illustrates a first example of a hyperspectral light source system in accordance with at least some embodiments of the present invention.

FIG. 1 illustrates a first example of a hyperspectral light source system in accordance with at least some embodiments of the present invention. Hyperspectral light source system 10 of FIG. 1 comprises broadband light source 12, collimating lens 14 and rotating multi bandpass filter 16. Rotating motor 18 may rotate rotating multi bandpass filter 16. For instance, rotating multi bandpass filter 16 may be fixed on an adaptor of rotating motor 18 rotating at a frequency from 0 to 250 Hz. Rotating multi bandpass filter 16 may be arranged to rotate continuously or stepwise as shown in FIG. 1.

That is, rotating multi bandpass filter 16 may be rotated in a nonstop manner, without any pauses or interruptions. Thus, the timing of broadband light source 12 may be controlled to match the selected rotation angle of rotating multi bandpass filter 16 so that light signals on the selected passband pass through rotating multi bandpass filter 16. As shown in FIG. 1, rotating multi bandpass filter 16 may be rotated step-by-step. However, in some embodiments, rotating multi bandpass filter 16 may be rotated continuously in a smooth manner, without any discrete steps, i.e., interruptions. Stepwise rotation provides a cheaper solution though, because rotating motor 18 does not need to be able to rotate smoothly.

In some embodiments, hyperspectral light source system 10 may comprise additional filters 20 and 22. For instance, additional filter 20 may be a short pass filter and additional filter 22 may be a long pass filter, or vice versa. Hyperspectral light source system 10 may also comprise a tunable filter. The tunable filter may be a tunable FPI. The tunable FPI may be adjusted to pass through light signals on the selected passband of hyperspectral light source system by adjusting a mirror gap of the interferometer, as explained for example in U.S. Pat. No. 9,835,847 B2. The mirror gap of the interferometer may be referred to as an air gap between mirrors of the interferometer as well. In the first example shown in FIG. 1 the interferometer is MFPI 24a in a Printed Circuit Board, PCB, package.

Broadband light source 12 may be arranged to generate and radiate broadband light signals to collimating lens 14 and collimating lens 14 may be arranged to collimate and direct collimated broadband light signals towards rotating multi bandpass filter 16. In some embodiments, collimating lens 14 may be absent though but use of collimating lens 14 provides better performance. Collimating lens 14 may be absent if for example a numerical aperture of broadband light source 12, such as a LED, is small, e.g., between ±5 and ±10 degrees.

A rotation angle of rotating multi bandpass filter 16 may determine a passband of rotating multi bandpass filter 16, the passband of rotating multi bandpass filter 16 being a part of a frequency band of the broadband light signal. That is, rotating multi bandpass filter 16 may be arranged to pass through a part of the broadband light signals on one of multiple passbands of hyperspectral light source system 10, wherein the rotation angle of rotating multi bandpass filter 16 determines the part of the broadband light signals that pass through rotating multi bandpass filter 16.

As an example, in first rotation states 16a, i.e., rotation steps during a first time interval, rotating multi bandpass filter 16 may pass through broadband light signals which are on a first part of a selected passband of hyperspectral light source system 10 and in second rotation states 16b, i.e., rotation steps during a second time interval, rotating multi bandpass filter 16 may pass through broadband light signals which are on a second part of the selected passband of hyperspectral light source system 10. If the first part is selected, broadband light source 12 may radiate broadband light signals while rotating multi bandpass filter 16 is in first rotation states 16a, i.e., during the first time interval. If the second part is selected, broadband light source 12 may radiate broadband light signals while rotating multi bandpass filter 16 is in second rotation states 16b, i.e., during the second time interval. Hence, only narrowband light signals may pass through rotating multi bandpass filter 16 and a passband of said narrowband light signals may be controlled by controlling timing of when broadband light source 12 is on.

Broadband light source 12 may be thus arranged to radiate broadband light signals to collimating lens 14 during a time interval to cause passing of light signals on one of the multiple passbands of hyperspectral light source system 10 through rotating multi bandpass filter 16. Hence, the frequency of light signals which are passed through may sweep for example from a starting point of said one passband to an end point of said one passband of hyperspectral light source system 10, during the time interval. Moreover, broadband light source 12 may be arranged to radiate first broadband light signals to collimating lens 14 during a first time interval to cause passing of the first broadband light signals on a first part of said one passband of hyperspectral light source system 10 through rotating multi bandpass filter 16 and to radiate second broadband light signals to collimating lens 14 during the second time interval to cause passing of the second broadband light signals on a second part of said one passband of hyperspectral light source system 10 through rotating multi bandpass filter 16. The rotation angle of rotating multi bandpass filter 16 may determine a passband of rotating multi bandpass filter 16 at a certain time, the passband of rotating multi bandpass filter 16 being a part of one passband of hyperspectral light source system 10.

For instance, broadband light source 12 may be turned on when the rotation angle of rotating multi bandpass filter 16 is θ−dθ, −θ−dθ, 180+θ−dθ or 180−θ−dθ degrees, and turned off at the angle θ+dθ, −θ+dθ, 180+θ+dθ or 180−θ+dθ degrees, etc., respectively. In some embodiments, de may be for example between 1 and 5 degrees, depending on θ.

Also, MFPI 24a may be adjusted to pass through light signals on the selected one passband of hyperspectral light source system 10, e.g., by adjusting a mirror gap of MFPI 24a. The passband, i.e., the wavelength band, for hyperspectral light source 10 may be therefore selected by adjusting the mirror gap of MFPI 24a and the rotation angle of rotating multi bandpass filter 16.

In some embodiments, hyperspectral light source system 10 may comprise beamsplitter plate 26, focusing lens 28 and output light intensity monitoring module 30. For instance, output light intensity monitoring module 30 may be a photodiode module. By placing plate beamsplitter 26, focusing lens 28 and output light intensity monitoring module 30 in the out beam coming from MFPI 24a it is possible to measure the spectral intensity of light at the selected frequency band. Plate beamsplitter 26 may be arranged to reflect light signals coming from MFPI 24a to focusing lens 28 and focusing lens 28 may be arranged to direct the light signals to output light intensity monitoring module 30. Output light intensity monitoring module 30 may be arranged to measure an intensity of the light signals.

In some embodiments, hyperspectral light source system 10 may comprise general controller 32, like a computer for example. Alternatively, or in addition, hyperspectral light source system 10 may comprise interferometer controller 34 on a PCB and/or broadband light source controller 36 on the PCB. Controllers 32, 34 and 36 may for example comprise at least a processing unit, memory, a transmitter and a receiver. The processing unit may be configured to perform controlling steps and control information may be transmitted using the transmitter.

Output light intensity monitoring module 30 may be arranged to transmit the intensity of the light signals to a controller, such as controllers 32, 34 and 36. The controller may be arranged to control timing and intensity of broadband light source 12 and/or adjust MFPI 24a based on the monitored light intensity. For instance, it is possible to use the monitored light intensity and a reference photodiode signal to fine tune pulse timing of broadband light source 12 to maximize the light output at the selected frequency band, such as a selected passband of hyperspectral light source system 10. The signal of output light intensity monitoring module 30 may be saved and used later in the data processing to normalize the light intensity for example in spectral reflectance measurements.

In some embodiments, hyperspectral light source system 10 may comprise sensor 38, such as a reflective optical sensor or a rotary encoder. Sensor 38 may be arranged to monitor an angle of rotation and/or rotation frequency of rotating multi bandpass filter 16. Sensor 38 may be arranged to measure and transmit the monitored angle of rotation to a controller, such as controllers 32, 34 and 36. The controller may be arranged to control timing of broadband light source 12 based on the monitored angle of rotation.

For instance, sensor 38 may receive optical sensor trigger pulses periodically from rotating multi bandpass filter 16. The rotation angle of rotating multi bandpass filter 16 may be determined using pulse counters from the reflective optical sensor trigger pulses received once per revolution or using a rotary encoder signal. Fine tuning of the rotation angle of rotating multi bandpass filter 16 may be made to maximize the output intensity based on the monitored pulses of photodiode signals for example.

Figure 2:
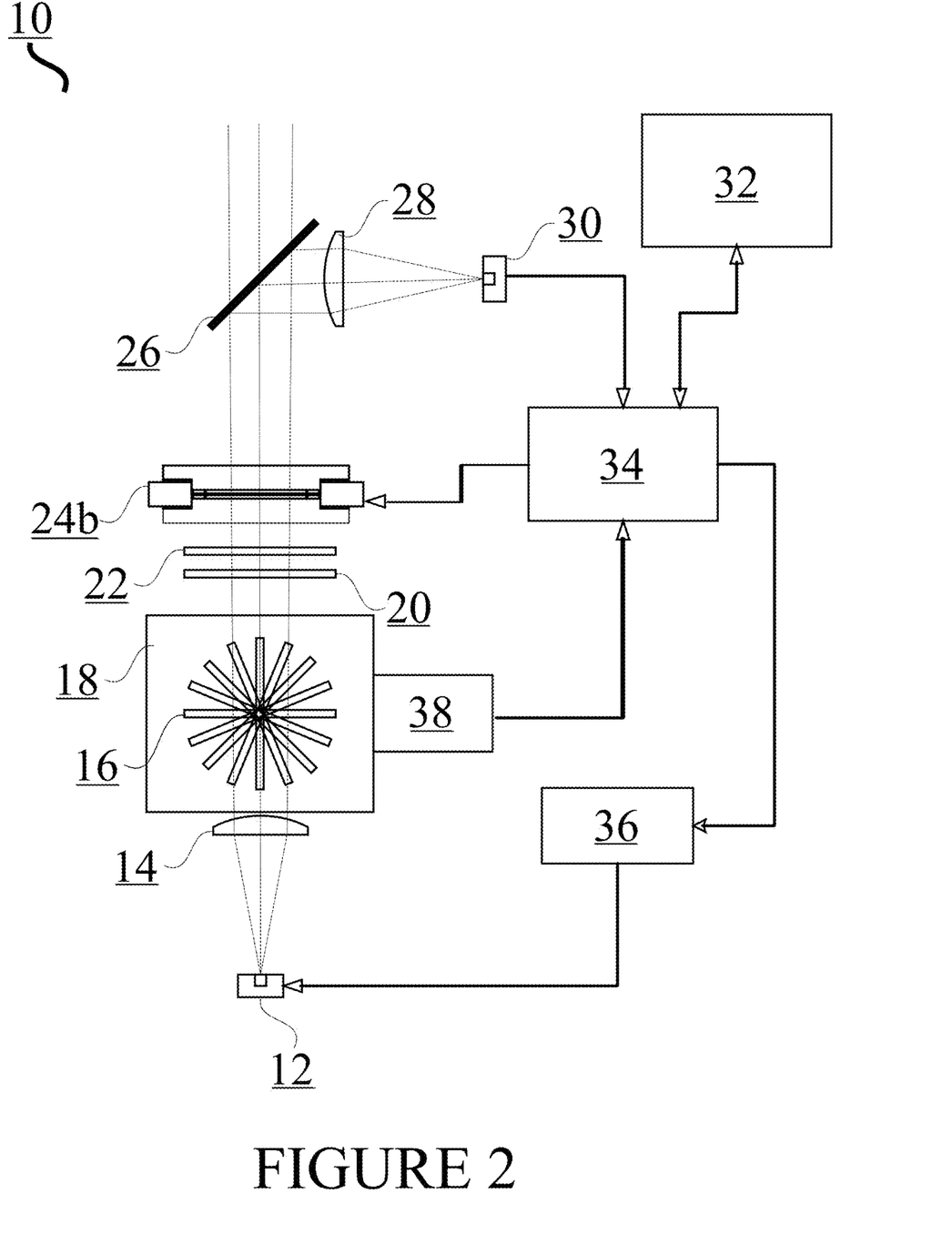
FIG. 2 illustrates a second example of a hyperspectral light source system in accordance with at least some embodiments of the present invention.

FIG. 2 illustrates a second example of a hyperspectral light source system in accordance with at least some embodiments of the present invention. The second example of hyperspectral light source system 10 shown in FIG. 2 is otherwise the same as the first example of hyperspectral light source system 10 shown in FIG. 1, but in the second example of FIG. 2 piezo-actuated FPI 24b is used as a tunable filter instead of MFPI 24a. The benefit is that the mirror gap of piezo-actuated FPI 24b may be controlled at much wider range than the mirror gap of MFPI 24a. In addition, the clear aperture of piezo-actuated FPI 24b is also larger than an aperture of MFPI 24a. Thus, the output intensity of hyperspectral light source 10 is larger with piezo-actuated FPI 24b than with MFPI 24a. Piezo-actuated FPI 24b may be arranged and controlled in the same way as MFPI 24a, and perform the same actions as well. In general, any suitable tunable filter may be arranged and controlled in the same way as MFPI 24a, and perform the same actions.

Figures 3A, 3B, 3C, 3D:
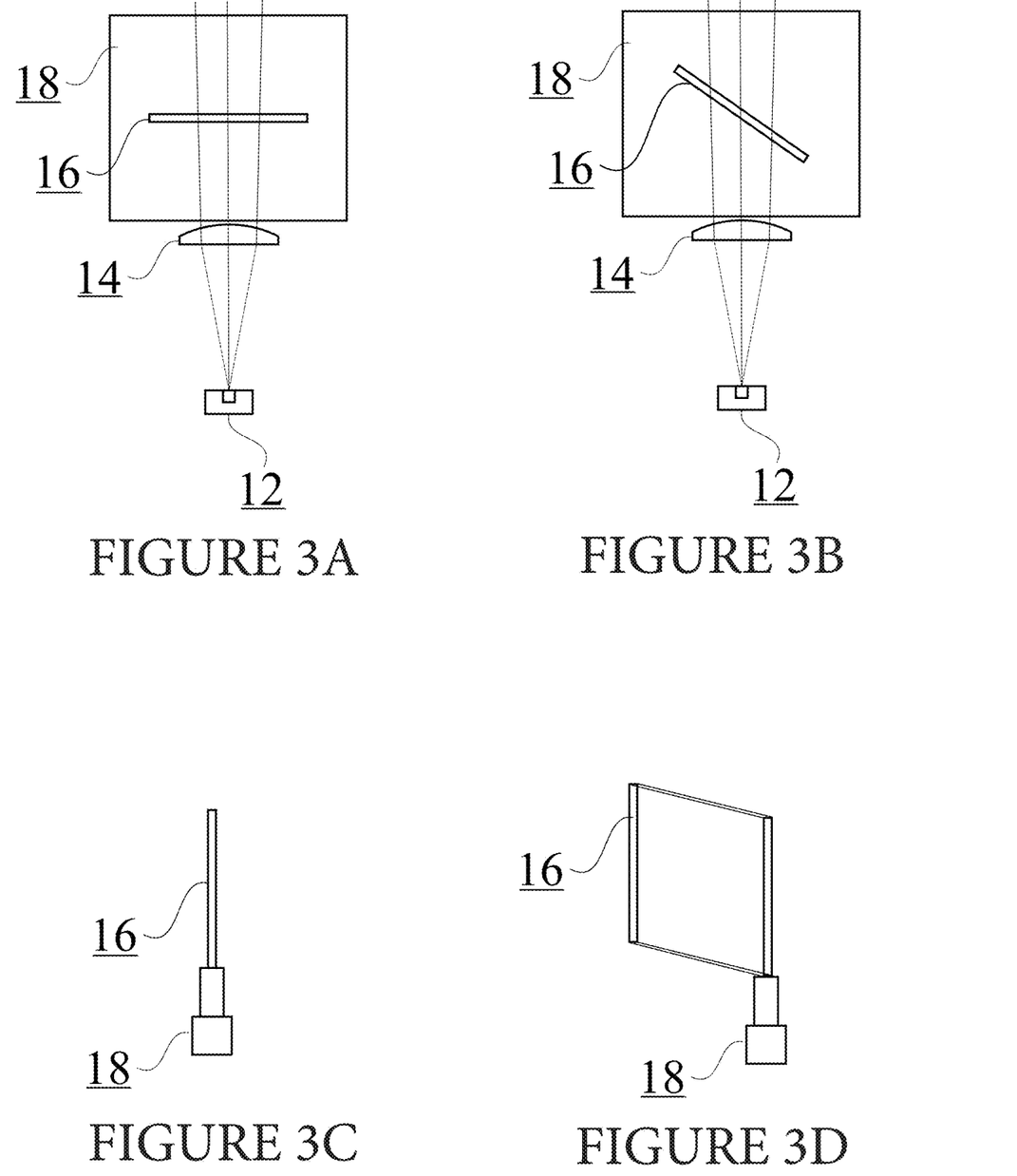
FIG. 3A illustrates a top view of a rotating multi bandpass filter with a rotation angle of 0 degrees in accordance with at least some embodiments of the present invention.
FIG. 3B illustrates a top view of a rotating multi bandpass filter with a rotation angle of 35 degrees in accordance with at least some embodiments of the present invention.
FIG. 3C illustrates a side view of a rotating multi bandpass filter with a rotation angle of 0 degrees in accordance with at least some embodiments of the present invention.
FIG. 3D illustrates a side view of a rotating multi bandpass filter with a rotation angle of 35 degrees in accordance with at least some embodiments of the present invention.

FIG. 3A illustrates a top view of a rotating multi bandpass filter with a rotation angle of 0 degrees in accordance with at least some embodiments of the present invention. FIG. 3B illustrates a top view of a rotating multi bandpass filter with a rotation angle of 35 degrees in accordance with at least some embodiments of the present invention.

FIG. 3C illustrates a side view of a rotating multi bandpass filter with a rotation angle of 0 degrees in accordance with at least some embodiments of the present invention. FIG. 3D illustrates a side view of a rotating multi bandpass filter with a rotation angle of 35 degrees in accordance with at least some embodiments of the present invention.

Figure 4:
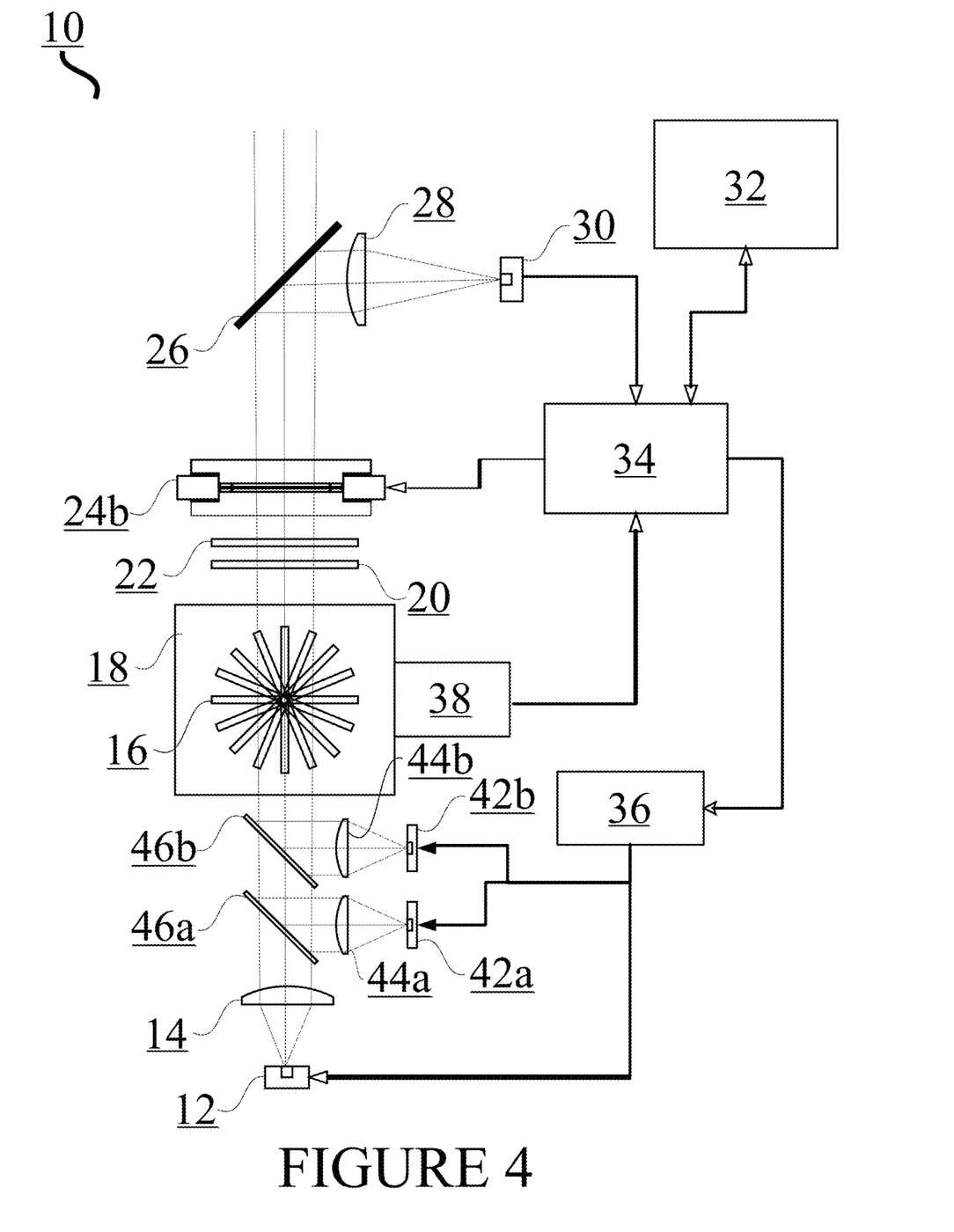
FIG. 4 illustrates a third example of a hyperspectral light source system in accordance with at least some embodiments of the present invention.

FIG. 4 illustrates a third example of a hyperspectral light source system in accordance with at least some embodiments of the present invention. In the third example of hyperspectral light source system 10 shown in FIG. 4, hyperspectral light source system 10 comprises multiple broadband light signal sources 12, 42a and 42b. Hyperspectral light source system 10 may comprise at least one other, additional broadband light source 42a, 42b arranged to generate and radiate light signals, wherein a frequency band of least one other broadband light source 42a, 42b is at least partly different compared to a frequency band of broadband light source 12.

In some embodiments, hyperspectral light source system 10 comprises at least one dichroic beamsplitter 46a, 46b and at least one other optional collimating lens 44a, 44b. For instance, another broadband light source 42a may be arranged to generate and radiate additional broadband light signals to another collimating lens 44*a*. Another collimating lens 44*a* may be arranged to collimate and direct the additional broadband light signals towards dichroic beamsplitter 46*a* and dichroic beamsplitter 46*a* may be arranged to reflect the additional broadband light signals to rotating multi bandpass filter 16 such that the additional broadband light signals are aligned with the broadband signals of broadband light source 12. In general, hyperspectral light source system 10 may comprise multiple additional broadband light sources 42*a*, 42*b* and each of multiple additional broadband light sources 42*a*, 42*b* may be associated with separate additional collimating lenses 44*a*, 44*b*, and separate dichroic beamsplitters 46*a*, 46*b*, arranged such that additional broadband light signals of multiple additional broadband light sources 42*a*, 42*b* are aligned with the broadband light signals of broadband light source 12.

Therefore, the frequency band of hyperspectral light source system 10 may be increased by using multiple broadband light signal sources 12, 42*a* and 42*b* whose light beams may be aligned using dichroic beamsplitters 46*a* and 46*b*. For instance, spectral range of broadband light source 12 may be 380-730 nm, spectral range of additional broadband light source 42*a* may be 430-730 nm and spectral range of additional broadband light source 42*b* may be 400-1000 nm.

In some embodiments, multiple broadband light signal sources 12, 42*a* and 42*b* may be LEDs. One benefit of using multiple LEDs is that it enables to lower the duty cycle of LEDs, thereby enabling higher operating currents and higher emitted power for LEDs.

Figure 5:
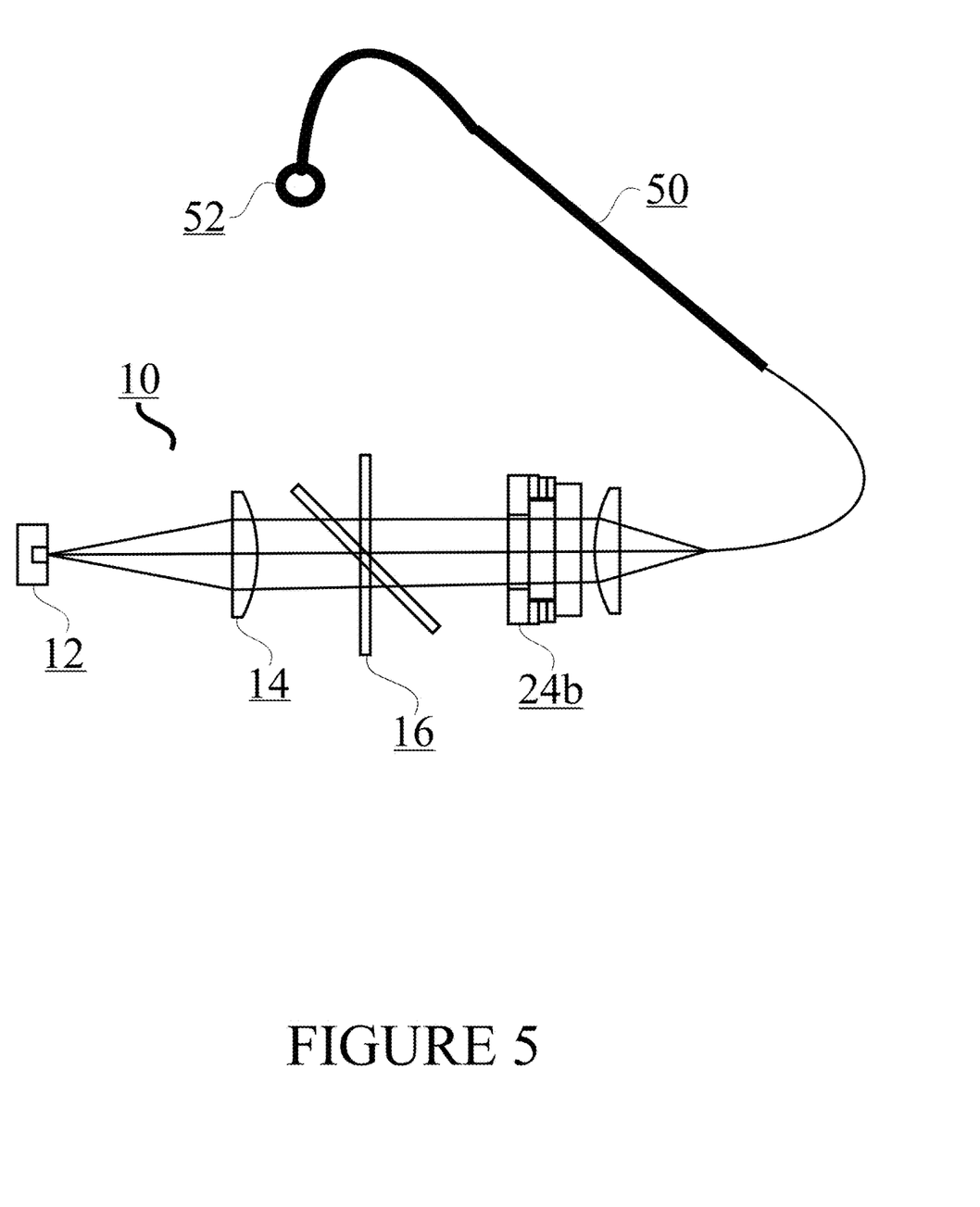
FIG. 5 illustrates a first example application in accordance with at least some embodiments of the present invention.

FIG. 5 illustrates a first example application in accordance with at least some embodiments of the present invention. The first example application shown in FIG. 5 is about a tunable light source system for intraoral hyperspectral imaging. FIG. 5 shows hyperspectral light source system 10 comprising broadband light source 12, collimating lens 14, rotating multi bandpass filter 16 and piezo-actuated FPI 24*b*. In addition, FIG. 5 shows intraoral imaging apparatus 50 comprising intraoral camera head 52. Broadband light signal source 12 may for example generate light signals having wavelengths of 500-1000 nm.

Figure 6:
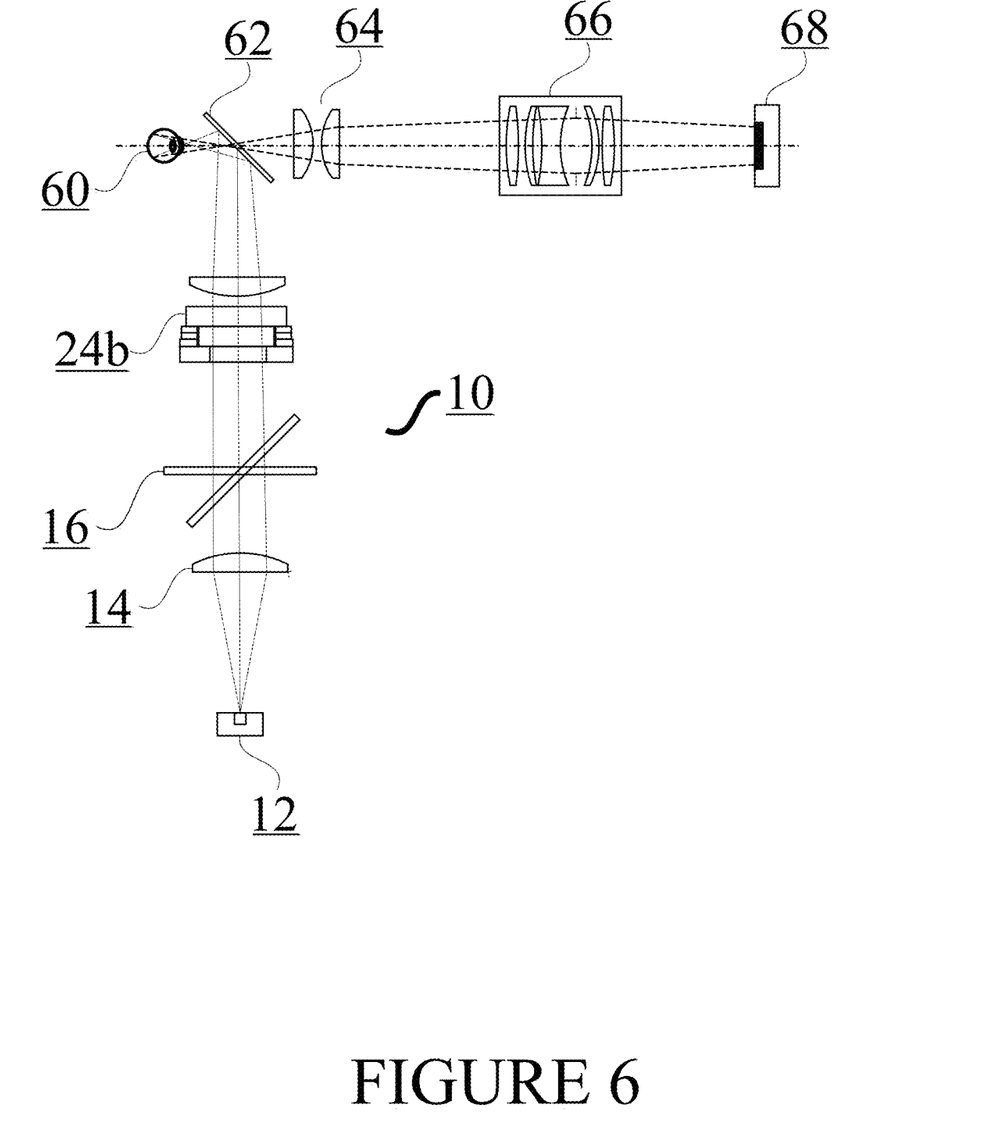
FIG. 6 illustrates a second example application in accordance with at least some embodiments of the present invention.

FIG. 6 illustrates a second example application in accordance with at least some embodiments of the present invention. The second example application shown in FIG. 6 is about a tunable light source system for retinal hyperspectral imaging. FIG. 6 shows hyperspectral light source system 10 comprising broadband light source 12, collimating lens 14, rotating multi bandpass filter 16 and piezo-actuated FPI 24*b*. In addition, FIG. 6 shows target/eye 60, semireflecting mirror 62, ocular optics 64, imaging objective 66 and image sensor 68.

The pulsed operation of hyperspectral light source system 10 may be used in retinal cameras. The retinal cameras may use wavelength range from 400 (440)-650 nm and Near Infrared, NIR, at 625-870 nm for focusing. For instance, it is possible to cover the wavelength range 420-650 nm at a resolution of 3-8 nm with one piezo-actuated FPI 24*b* and one rotating, angle-tuned multi bandpass filter 16. Rotating multi bandpass filter 16 may be arranged to pass through the NIR light at 625-870 nm, to enable the focusing, when needed.

Figure 7:
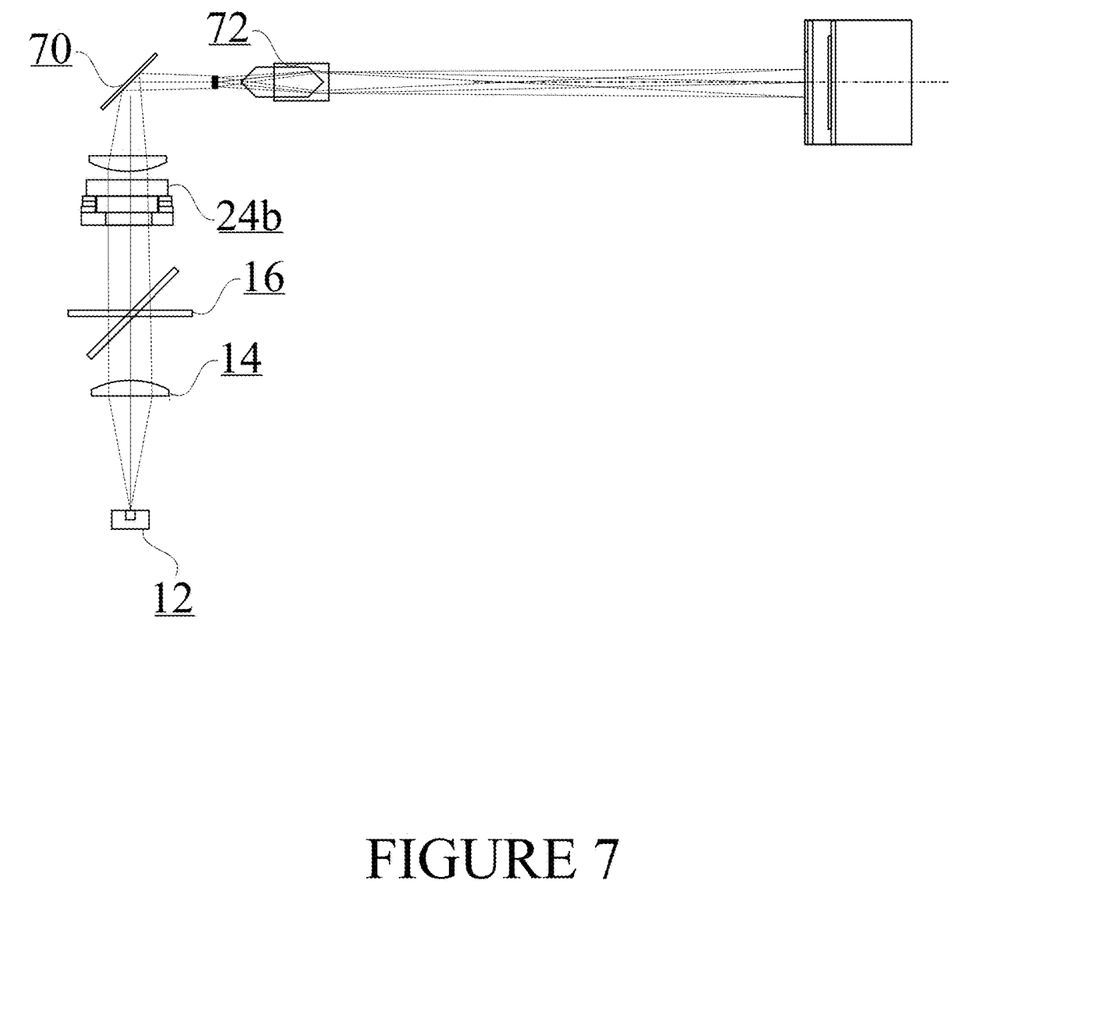
FIG. 7 illustrates a third example application in accordance with at least some embodiments of the present invention.

FIG. 7 illustrates a third example application in accordance with at least some embodiments of the present invention. The third example application shown in FIG. 7 is about a tunable light source system for microscope hyperspectral imaging. FIG. 7 shows hyperspectral light source system 10 comprising broadband light source 12, collimating lens 14, rotating multi bandpass filter 16 and piezo-actuated FPI 24*b*. In addition, FIG. 7 shows mirror 70 and microscope objective 72.

Broadband light source 12 may be a LED with 450-850 nm wavelength range. For instance, it is possible to cover the wavelength range 450-850 nm at a resolution of 3-8 nm with one piezo-actuated FPI 24*b* and one rotating, angle-tuned multi bandpass filter 16.

Figure 8:
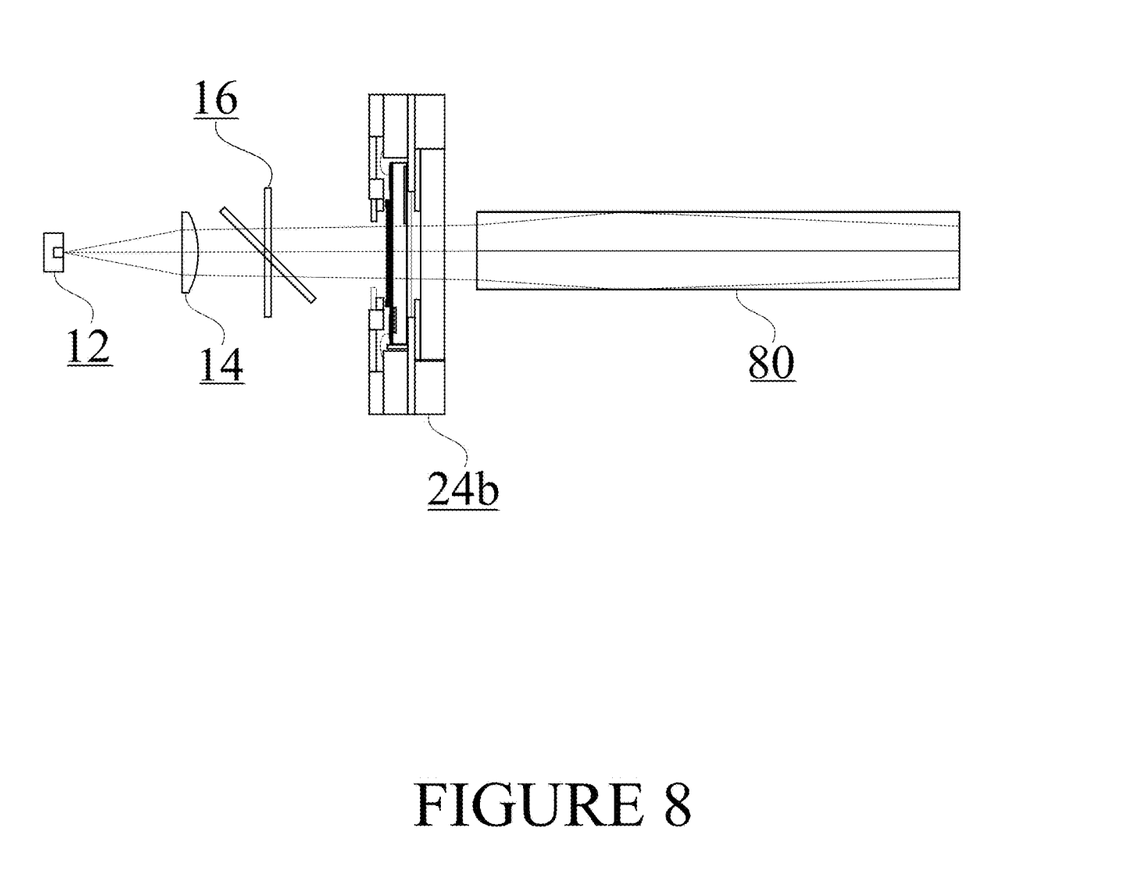
FIG. 8 illustrates a fourth example application in accordance with at least some embodiments of the present invention.

FIG. 8 illustrates a fourth example application in accordance with at least some embodiments of the present invention. The fourth example application shown in FIG. 8 is about a tunable light source system for a light pipe beam homogenizer. FIG. 8 shows hyperspectral light source system 10 comprising broadband light source 12, collimating lens 14, rotating multi bandpass filter 16 and piezo-actuated FPI 24*b*. In addition, FIG. 8 shows hexagonal light pipe 80.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in hyperspectral imaging.

Acronyms List

FPI Fabry-Perot Interferometer
LED Light Emitting Diode
MFPI Microelectromechanical system FPI
NIR Near Infrared
PCB Printed Circuit Board

| REFERENCE SIGNS LIST | |
|---|---|
| 10 | Light source system |
| 12, 42a, 44b | Broadband light source |
| 14, 44a, 44b | Collimating lens |
| 16 | Rotating motor |
| 16a, 16b | Rotation steps during a time interval |
| 18 | Rotating multi bandpass filter |
| 20, 22 | Additional filters |
| 24a | MFPI |
| 24b | piezo-actuated FPI |
| 26 | Beamsplitter plate |
| 28 | Focusing lens |
| 30 | Output light intensity monitoring module |
| 32, 34, 36 | Controllers |
| 38 | Sensor |
| 46a, 46b | Dichroic beamsplitter |
| 50 | Intraoral imaging apparatus |
| 52 | Intraoral camera head |
| 60 | Target/Eye |
| 62 | Semireflecting mirror |
| 64 | Ocular optics |
| 66 | Imaging objective |
| 68 | Image sensor |
| 70 | Mirror |
| 72 | Microscope objective |
| 80 | Hexagonal light pipe |

The invention claimed is:

1. A hyperspectral light source system, comprising:
a broadband light source arranged to generate and radiate a broadband light signal;
a rotating multi bandpass filter arranged to pass through a part of the broadband light signal on one of multiple passbands of the hyperspectral light source system, wherein a rotation angle of the rotating multi bandpass filter determines the part of the broadband light signal that passes through the rotating multi bandpass filter; and
a tunable filter adjusted to pass through the part of the broadband light signal, coming from the rotating multi bandpass filter, on said one passband of the hyperspectral light source system,
wherein the broadband light source is arranged to radiate a first broadband light signal during a first time interval to cause passing of the first broadband light signal on a first part of said one passband of the hyperspectral light source system through the rotating multi bandpass filter and to radiate a second broadband light signal during a second time interval to cause passing of the second broadband light signal on a second part of said one passband of the hyperspectral light source system through the rotating multi bandpass filter, and
a sensor arranged to monitor the angle of rotation of the rotating multi bandpass filter and transmit the monitored angle of rotation to a controller; the controller arranged to control timing of the broadband light source based on the monitored angle of rotation.

2. The hyperspectral light source system according to claim 1, wherein the rotating multi bandpass filter is arranged to rotate continuously.

3. The hyperspectral light source system according to claim 1, wherein the rotating multi bandpass filter is arranged to rotate stepwise.

4. The hyperspectral light source system according to claim 1, wherein the broadband light source is arranged to radiate the broadband light signal during a time interval to cause passing of the part of the broadband light signal on said one passband of the hyperspectral light source system through the rotating multi bandpass filter.

5. The hyperspectral light source system according to claim 1, wherein the rotation angle of the rotating multi bandpass filter determines a passband of the rotating multi bandpass filter at a certain time, the passband of the rotating multi bandpass filter being a part of said one passband of the hyperspectral light source system.

6. The hyperspectral light source system according to claim 1, wherein the rotating multi bandpass filter is arranged to rotate at a frequency above 0 Hz and at most at a frequency of 250 Hz.

7. The hyperspectral light source system according to claim 1, wherein the tunable filter is adjusted to pass through the part of the broadband light signal on said one passband of the hyperspectral light source system by adjusting a mirror gap of the tunable filter.

8. The hyperspectral light source system according to claim 1, wherein the tunable filter is a tunable Fabry-Perot interferometer, a Lyot filter, an Acousto-optic filter or a liquid crystal modulator.

9. The hyperspectral light source system according to claim 8, wherein the tunable Fabry-Perot interferometer is a piezo-actuated Fabry-Perot interferometer or a microelectromechanical system Fabry-Perot interferometer.

10. The hyperspectral light source system according to claim 1, further comprising:
a plate beamsplitter arranged to reflect light signals coming from the tunable filter to a focusing lens;
the focusing lens arranged to direct the light signals to an output light intensity monitoring module;
the output light intensity monitoring module arranged to measure and transmit an intensity of the light signals to a controller; and
the controller arranged to control timing of the broadband light source and/or the tunable filter based on the monitored light intensity.

11. The hyperspectral light source system according to claim 1, further comprising:
another broadband light source arranged to generate and radiate an additional light signal, wherein a frequency band of said another broadband light source is at least partly different compared to a frequency band of the broadband light source.

12. The hyperspectral light source system according to claim 11, further comprising:
a dichroic beamsplitter arranged to reflect the additional broadband light signal towards the rotating multi bandpass filter such that the additional broadband signal is aligned with the broadband signal of the broadband light source.

13. The hyperspectral light source system according to claim 1, further comprising multiple additional broadband light sources, wherein each of said multiple additional broadband light sources is associated with a separate dichroic beamsplitter, and said dichroic beamsplitters are arranged such that additional broadband light signals of said multiple additional broadband light sources are aligned with the broadband light signals of the broadband light source.

* * * * *